United States Patent
Chen et al.

(10) Patent No.: US 11,653,757 B2
(45) Date of Patent: May 23, 2023

(54) AUTOMATICALLY ADJUSTABLE SMART SHELF, CARGO STORING METHOD AND UNMANNED LOGISTICS SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Wei Chen, Beijing (CN); Jun Xiao, Beijing (CN); Jinhua Cai, Beijing (CN); Yanguang Liu, Beijing (CN); Chen Fan, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 122 days.

(21) Appl. No.: 16/772,918

(22) PCT Filed: Sep. 27, 2018

(86) PCT No.: PCT/CN2018/107941
§ 371 (c)(1),
(2) Date: Jun. 15, 2020

(87) PCT Pub. No.: WO2019/119917
PCT Pub. Date: Jun. 27, 2019

(65) Prior Publication Data
US 2021/0161292 A1  Jun. 3, 2021

(30) Foreign Application Priority Data
Dec. 20, 2017 (CN) .......................... 201711383037.7

(51) Int. Cl.
*A47B 57/06* (2006.01)
*B65G 1/04* (2006.01)
(Continued)

(52) U.S. Cl.
CPC ................ *A47B 57/06* (2013.01); *B65G 1/04* (2013.01); *A47B 2220/0097* (2013.01);
(Continued)

(58) Field of Classification Search
CPC ............ A47B 57/06; A47B 2220/0097; B64C 39/024; B64C 2201/128; B64D 9/00; B65G 1/04; B60P 3/00; B64U 2101/60
See application file for complete search history.

(56) References Cited

U.S. PATENT DOCUMENTS 3,982,801 A * 9/1976 Heidorn ................. A47B 57/06
                                                                 62/132
4,329,928 A * 5/1982 Shaw ..................... A47B 51/00
                                                                 108/106
(Continued)

FOREIGN PATENT DOCUMENTS

| CN | 204489751 U | 7/2015 |
| CN | 205140085 U | 4/2016 |

(Continued)

OTHER PUBLICATIONS

International Search Report and Written Opinion dated Nov. 22, 2018 (with English Translation and English Translation of Category of Cited Documents) citing documents therein, 14 pages.

*Primary Examiner* — Devin K Barnett
(74) *Attorney, Agent, or Firm* — Oblon, McClelland, Maier & Neustadt, L.L.P.

(57) ABSTRACT

The present disclosure relates to an automatically adjustable smart shelf, a cargo storing method, and an unmanned logistics system. The automatically adjustable smart shelf includes a shelf outer frame and a control unit. A first movable shelf layer and a second movable shelf layer provided on the shelf outer frame and respectively movable along a first direction and a second direction intersecting with each other. A control unit can control the first movable
(Continued)

shelf layer and the second movable shelf layer to move along the first direction and the second direction respectively, so as to form various sizes of storage space for storing various cargos accordingly.

8 Claims, 2 Drawing Sheets

(51) Int. Cl.
  *B64C 39/02* (2023.01)
  *B64D 9/00* (2006.01)
  *B64U 101/60* (2023.01)
(52) U.S. Cl.
  CPC .............. *B64C 39/024* (2013.01); *B64D 9/00* (2013.01); *B64U 2101/60* (2023.01)

(56) References Cited

U.S. PATENT DOCUMENTS

| | | | | |
|---|---|---|---|---|
| 4,619,208 | A * | 10/1986 | Kurrasch | A47B 5/02 108/106 |
| 4,915,461 | A * | 4/1990 | Kingsborough | A47B 77/10 312/247 |
| 5,624,169 | A * | 4/1997 | Bishop, Jr. | A47B 51/00 312/9.55 |
| 6,676,233 | B1 * | 1/2004 | Evans | B66B 9/02 187/401 |
| 7,584,016 | B2 * | 9/2009 | Weaver | G06Q 10/087 700/213 |
| 8,226,184 | B2 * | 7/2012 | Kang | A47B 57/06 312/319.1 |
| 8,424,983 | B1 * | 4/2013 | Strauss | A47B 51/00 312/247 |
| 8,972,045 | B1 * | 3/2015 | Mountz | G06Q 10/08 700/229 |
| 10,138,060 | B1 * | 11/2018 | Mantha | B25J 15/0253 |
| 10,561,235 | B1 * | 2/2020 | Abbott | A47B 77/10 |
| 10,849,425 | B2 * | 12/2020 | Esposito | A47B 96/025 |
| 11,198,363 | B1 * | 12/2021 | Jinnah | B62B 3/02 |
| 2002/0124777 | A1 * | 9/2002 | Lag | A47B 9/06 108/20 |
| 2006/0071774 | A1 * | 4/2006 | Brown | G07F 9/026 340/522 |
| 2007/0156261 | A1 * | 7/2007 | Caldwell | A47B 57/00 700/60 |
| 2009/0076650 | A1 * | 3/2009 | Faes | G07F 11/42 700/231 |
| 2009/0248198 | A1 * | 10/2009 | Siegel | G06Q 10/08 700/231 |
| 2009/0255292 | A1 * | 10/2009 | Benz | A47B 57/06 700/275 |
| 2014/0252930 | A1 * | 9/2014 | Reid | A47B 46/005 312/247 |
| 2015/0206188 | A1 * | 7/2015 | Tanigawa | G06Q 30/0261 705/14.58 |
| 2015/0330700 | A1 * | 11/2015 | Celik | F25D 25/02 312/405.1 |
| 2016/0273750 | A1 * | 9/2016 | Burke | F21V 23/002 |
| 2017/0299387 | A1 * | 10/2017 | Bryan | H04N 9/3179 |
| 2018/0271281 | A1 * | 9/2018 | Bryan | A47F 3/06 |
| 2019/0098995 | A1 * | 4/2019 | Brown | A47B 57/545 |
| 2020/0019921 | A1 * | 1/2020 | Buibas | G06K 9/6267 |
| 2020/0125854 | A1 * | 4/2020 | Seres | G06Q 10/101 |
| 2020/0218245 | A1 * | 7/2020 | Gu | G06Q 10/06 |
| 2020/0246838 | A1 * | 8/2020 | Liu | B07C 3/08 |
| 2022/0033185 | A1 * | 2/2022 | Chen | B65G 1/06 |

FOREIGN PATENT DOCUMENTS

| | | |
|---|---|---|
| CN | 206537814 U | 10/2017 |
| CN | 207810398 U | 9/2018 |
| DE | 101 25 790 A1 | 11/2002 |
| DE | 10 2004 061 275 B4 | 6/2007 |

\* cited by examiner

AUTOMATICALLY ADJUSTABLE SMART SHELF, CARGO STORING METHOD AND UNMANNED LOGISTICS SYSTEM

CROSS-REFERENCE TO RELATED APPLICATIONS

The present application is a U.S. National Stage Application under 35 U.S.C. § 371 of International Patent Application No. PCT/CN2018/107941, filed on Sep. 27, 2018, which is based on and claims priority to China Patent Application No. 201711383037.7 filed on Dec. 20, 2017, the disclosure of both which are incorporated by reference herein in its entirety.

TECHNICAL FIELD

The present disclosure relates to the technical of unmanned logistics technology, and in particular, to an automatically adjustable smart shelf, a cargo storing method, and an unmanned logistics system.

BACKGROUND

Since there is a need to frequently store, transport and straighten up the shelf in the unmanned logistics system, the storage capacity of the shelf determines the storage capacity of the unmanned logistics system to a certain extent. Whether the position of a cargo on the shelf can be accurately acquired determines the efficiency of access to the cargo to a certain extent.

The shelf in the related art is a fixed-layer type shelf. When different sizes of cargos are addressed, there is insufficient utilization of the shelf space, which directly results in problems such as low storage capacity and low transport capacity. Since the cargos on fixed shelves are placed irregularly, it is impossible to acquire a position of each cargo, which causes certain difficulties for rapid access to the cargos.

SUMMARY

In view of this, the embodiments of the present disclosure provide an automatically adjustable smart shelf, a cargo storing method, and an unmanned logistics system, which can make full use of the shelf space and improve the storage capacity of the shelf.

In one aspect of the present disclosure, an automatically adjustable smart shelf is provided. The automatically adjustable smart shelf includes: a shelf outer frame, wherein a first movable shelf layer and a second movable shelf layer provided on the shelf outer frame and respectively movable along a first direction and a second direction intersecting with each other; and a control unit configured to control the first movable shelf layer and the second movable shelf layer to move along the first direction and the second direction respectively, so as to form various sizes of storage space for storing various cargos respectively.

In some embodiments, the first direction is a horizontal direction, the second direction is a vertical direction, and the first movable shelf layer is arranged vertically and the second movable shelf layer is arranged horizontally.

In some embodiments, a movement guide rail is provided on the shelf outer frame, on which the first movable shelf layer and the second movable shelf layer move.

In some embodiments, the first movable shelf layer and the second movable shelf layer are both formed of a plurality of rods.

In some embodiments, both ends of each of the plurality of rods are mounted on a movement guide rail of the shelf outer frame.

In some embodiments, a second guide rail is provided on the shelf outer frame and on both sides of the first movable shelf layer, on which the second movable shelf layer moves, and a first guide rail is provided on the shelf outer frame and on both sides of the second movable shelf layer, on which the first movable shelf layer moves.

In some embodiments, the first movable shelf layer is provided with a first distance detector configured to detect a distance between the first movable shelf layer and a cargo and feed the distance back to the control unit, and the second movable shelf layer is provided with a second distance detector configured to detect a distance between the second movable shelf layer and a cargo and feed the distance back to the control unit.

In some embodiments, the first distance detector is configured to detect a distance between the first movable shelf layer and the shelf outer frame and feed the distance back to the control unit, and the second distance detector is configured to detect a distance between the second movable shelf layer and the shelf outer frame and feed the distance back to the control unit.

In some embodiments, including one or at least two first movable shelf layers and/or one or at least two second movable shelf layers.

In one aspect of the present disclosure, a cargo storing method of the above-described automatically adjustable smart shelf. The cargo storing method includes: determining whether there is a suitable allocated area, such that if so, a cargo is placed into an allocated area, and if not, a cargo is placed into an unallocated area.

In some embodiments, the unallocated area is located diagonally to the allocated area.

In some embodiments, a criteria for determining whether there is a suitable allocated area is as follows: if a size of the allocated area is larger than a size of the cargo and the size difference between the allocated area and the cargo is greater than a preset qualified distance, then it is determined that there is a suitable allocated area, otherwise it is determined that there is not a suitable allocated area.

In some embodiments, the preset qualified distance is 20 cm.

In some embodiments, further including a moving step after the cargo is placed in the unallocated area, wherein the moving step includes: the control unit controls the first movable shelf layer and the second movable shelf layer to move along the first direction and the second direction respectively, until the first movable shelf layer and the second movable shelf layer move to a position at a preset distance from the cargo.

In some embodiments, the preset distance is 10 cm.

In some embodiments, further including a determining step after the moving step, wherein the determining step includes: if the shelf is fully occupied, loading process ends, and if the shelf is not fully occupied, return to the step of determining whether there is a suitable allocation area.

In some embodiments, further including a determining step after the cargo is placed into the allocated area, wherein the determining step includes: if the shelf is fully occupied, loading process ends, and if the shelf is not fully occupied, returning to the step of determining whether there is a suitable allocated area.

In one aspect of the present disclosure, an unmanned logistics system is provided. The unmanned logistics system includes the above-described automatically adjustable smart shelf.

Therefore, based on the above-described technical solution, in the automatically adjustable smart shelf of the present disclosure, a first movable shelf layer and a second movable shelf layer that can be provided on the frame outer frame and respectively movable along a first direction and a second direction intersecting with each other. The control unit can control the first movable shelf layer and the second movable shelf layer to move along the first direction and the second direction respectively. A maximum storage capacity of various cargos in the same shelf is implemented using a dynamically adjustable shelf layer, thereby effectively improving the storage capacity of the shelf. The cargo storing method of the automatically adjustable smart shelf and the unmanned logistics system provided by the present disclosure also correspondingly have the above-described advantageous technical effects.

BRIEF DESCRIPTION OF THE DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure. In the accompanying drawings.

Figure 1:
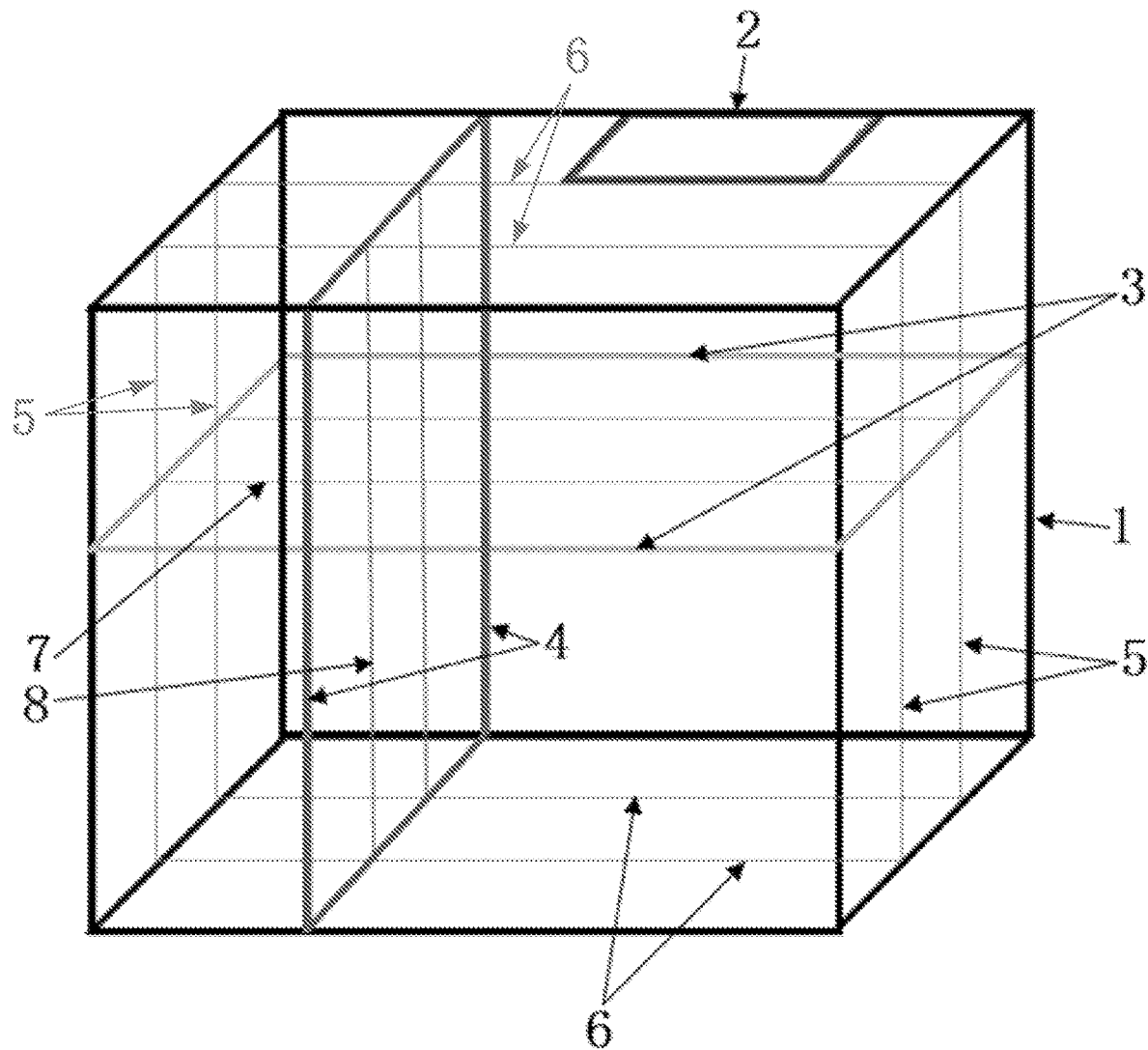
FIG. 1 is a schematic view of an overall structure of an automatically adjustable smart shelf according to some embodiments of the present disclosure.

Each of the reference signs respectively represents: 1. shelf outer frame; 2. control unit; 3. second movable shelf layer; 4. first movable shelf layer; 5. second guide rail; 6. first guide rail; 7. second distance detector; 8. first distance detector.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure can be implemented in many different forms, which are not limited to the embodiments described herein. These embodiments are provided to make the present disclosure thorough and complete, and fully convey the scope of the present disclosure to those skilled in the art. It should be noted that, unless otherwise specified, the relative arrangements of the components and steps expounded in these embodiments should be construed as merely illustrative, rather than as a delimitation.

The words "first", "second", and similar words used in the present disclosure do not denote any order, quantity or importance, but merely serve to distinguish different parts. Such similar words as "including" or "containing" mean that the element preceding the word encompasses the elements enumerated after the word, and does not exclude the possibility of encompassing other elements as well. The terms "up", "down", "left", "right", or the like are used only to represent a relative positional relationship, and the relative positional relationship can be changed correspondingly if the absolute position of the described object changes.

In the present disclosure, when it is described that a particular device is located between the first device and the second device, there can be an intermediate device between the particular device and the first device or the second device, and alternatively, there can be no intermediate device. When it is described that a particular device is connected to other devices, the particular device can be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

In some embodiments of the automatically adjustable smart shelf of the present disclosure, as shown in FIG. 1, the automatically adjustable smart shelf includes a shelf outer frame 1 and a control unit 2. A first movable shelf layer 4 and a second movable shelf layer 3 that can be provided in the shelf outer frame 1 and respectively movable along a first direction and a second direction intersecting with each other. The control unit 2 can control the first movable shelf layer 4 and the second movable shelf layer 3 to move along the first direction and the second direction respectively so as to form various sizes of storage space for storing various cargos accordingly.

In these embodiments, by providing a first movable shelf layer 4 and a second movable shelf layer 3 on the shelf outer frame 1 and respectively movable along a first direction and a second direction intersecting with each other, and enabling the control unit 2 to control the first movable shelf layer 4 and the second movable shelf layer 3 to move along the first direction and the second direction respectively, a maximum storage capacity of various cargos in the same shelf is implemented using a dynamically adjustable shelf layer, thereby effectively improving the storage capacity of the shelf. As shown in FIG. 1, the automatically adjustable smart shelf includes one or at least two first movable shelf layer 4 and/or one or at least two second movable shelf layer 3, so that the shelf can be divided into a plurality of mesh areas for storing cargos according to actual needs. The first movable shelf layer 4 and the second movable shelf layer 3 are both alternatively formed by a plurality of rods. The shelf layer formed by the rods can stop the first movable shelf layer 4 and the second movable shelf layer 3 from interfering with each other during movement, and ensure the stability in movement.

In these embodiments, as long as the first direction and the second direction are arranged to intersect with each other, a dynamically adjustable shelf layer can be realized. Alternatively, as shown in FIG. 1, the first direction is a horizontal direction and the second direction is a vertical direction. The first movable shelf layer 4 is arranged vertically, and the second movable shelf layer 3 is arranged horizontally, thereby facilitating stably placing the cargos.

For how to implement moving the first movable shelf layer 4 and the second movable shelf layer 3, in some embodiments, as shown in FIG. 1, a movement guide rail is provided on the shelf outer frame 1, on which the first movable shelf layer 4 and the second movable shelf layer 3 move. Such structural form is simply and easily implemented, and has a high enforceability. In embodiments where the first movable shelf layer 4 and the second movable shelf layer 3 are both formed by a plurality of rods, in order to make the structure simple and the movement stable, as shown in FIG. 1, both ends of each of the plurality of rods are preferably mounted on the movement guide rail of the shelf outer frame 1.

In order to further improve a moving stability of the first movable shelf layer 4 and the second movable shelf layer 3, as shown in FIG. 1, a second guide rail 5 is provided on the shelf outer frame 1 and on both sides of the first movable shelf layer 4, on which the second movable shelf layer 3 moves, and a first guide rail 6 is provided on the shelf outer frame 1 and on both sides of the second movable shelf layer 3, on which the first movable shelf layer 4 moves.

In order to facilitate the control unit 2 to control movement distances of the first movable shelf layer 4 and the second movable shelf layer 3 so as to form different sizes of storage space, in some embodiments, as shown in FIG. 1, the first movable shelf layer 4 is provided with a first distance detector 8 for detecting a distance between the first movable shelf layer 4 and the cargo and feeding the distance back to the control unit 2, and the second movable shelf layer 3 is provided with a second distance detector 7 for detecting a distance between the second movable shelf layer 3 and the cargo and feeding the distance back to the control unit 2. Further, the first distance detector 8 is also configured to detect a distance between the first movable shelf layer 4 and the shelf frame 1 and feed the distance back to the control unit 2. The second distance detector 7 is also configured to detect a distance between the second movable shelf layer 3 and the shelf outer frame 1 and feed the distance back to the control unit 2. In this way, the control unit 2 can acquire an accurate position of each cargo according to distances of the first movable shelf layer 4 and the second movable shelf layer 3 relative to the shelf outer frame 1, thereby facilitating rapid access to the cargos.

Since a movement distance of each shelf is recorded in the control unit 2, the control unit 2 can acquire a specific position of each cargo, thereby accomplishing a dynamic adjustable cargo storing, and at the same time obtaining an accurate position of each cargo to serve rapid access in the unmanned logistics system.

Figure 2:
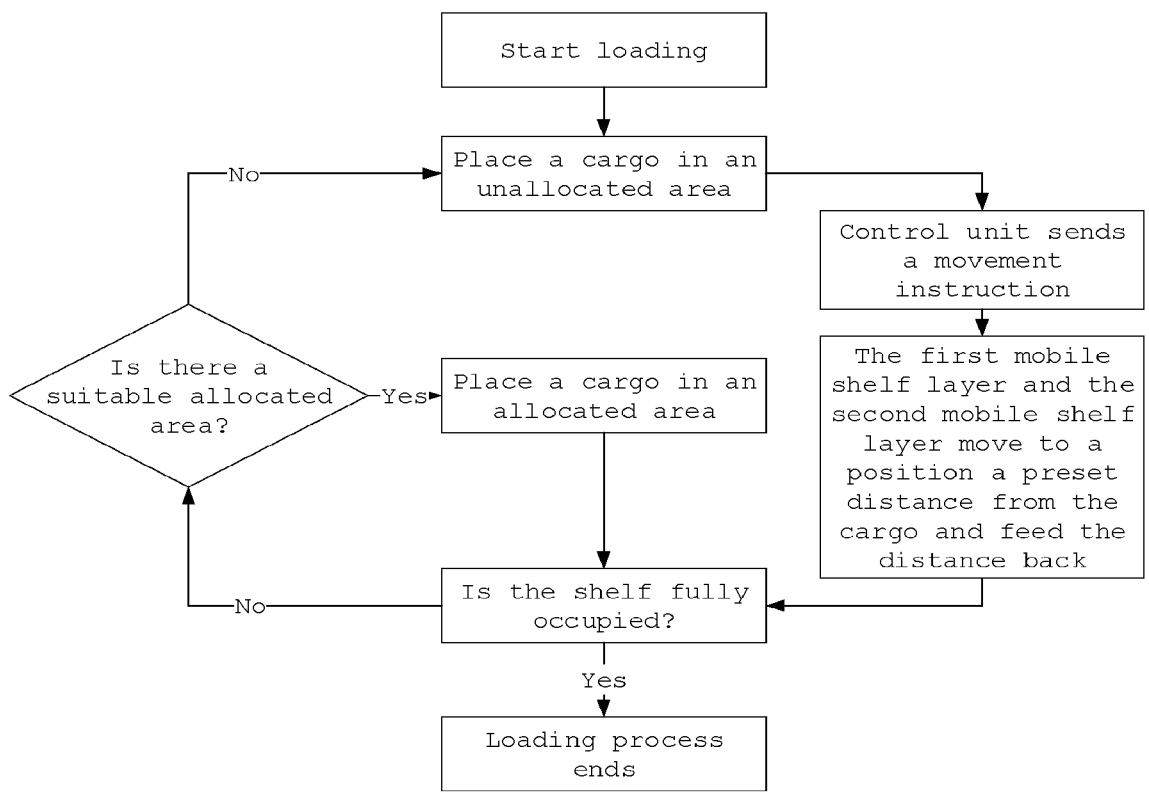
FIG. 2 is a schematic flowchart of a cargo storing method of an automatically adjustable smart shelf according to some embodiments of the present disclosure.

Correspondingly, the present disclosure also provides a cargo storing method of the above-described automatically adjustable smart shelf. As shown in conjunction with FIG. 2, the method includes: determining whether there is a suitable allocated area. If so, the cargo is placed into the allocated area; if not, the cargo is placed into the unallocated area.

In this method, by placing the cargo within the allocated area in priority, if the cargo cannot be placed in the allocated area, the cargo is placed in the unallocated area, which can improve the utilization rate of each area of the shelf. As shown in conjunction with FIG. 1, the unallocated area which is located diagonally to the allocated area, is not limited by the length and width dimensions of the allocated area, so that a new cargo can be placed freely.

Specifically or alternatively, the criteria for determining whether there is a suitable allocated area is as follows: if the size of the allocated area is larger than the size of the cargo and the size difference between the allocated area and the cargo is greater than a preset qualified distance, then it is determined that there is a suitable allocated area, otherwise it is determined that there is not a suitable allocated area. In this way, it is possible to ensure that the cargo is placed safely and avoid damage to the cargo caused by limited space. Specifically or alternatively, the preset qualified distance is 20 cm.

In the storage process, the above-described cargo storing method further includes a determining step after the cargo is placed into the allocated area, wherein the determining step includes: if the shelf is fully occupied, loading process ends, and if the shelf is not fully occupied, return to the step of determining whether there is a suitable allocated area.

The above-described cargo storing method can alternatively further include a moving step after the cargo is placed in the unallocated area, wherein the moving step includes: the control unit 2 controls the first movable shelf layer 4 and the second movable shelf layer 3 to move along the first direction and the second direction respectively, until the first movable shelf layer 4 and the second movable shelf layer 3 move to a position at a preset distance from the cargo. A suitable storage area can be formed by moving the first movable shelf layer 4 and the second movable shelf layer 3 for a proper distance, thereby further improving the space utilization. Specifically or preferably, the preset distance is 10 cm.

During the storage process, the above-described cargo storing method further includes a determining step after the moving step, wherein the determining step includes: if the shelf is fully occupied, loading process ends, and if the shelf is not fully occupied, return to the step of determining whether there is a suitable allocated area.

Next, the following uses the embodiment shown in FIG. 1 as an example in conjunction with the cargo storing method of the present disclosure to explain the cargo storing process:

The initial state of the shelf is that the second movable shelf layer 3 is stacked on the uppermost layer, and the first movable shelf layer 4 is stacked on the rightmost side. The placement of the cargo on the shelf starts from the left lower corner. After the placement of the first cargo is accomplished, the control unit 2 controls the first movable shelf layer 4 and the second movable shelf layer 3 to start moving. The first distance detector 8 and the second distance detector 7 start to work, and when it is detected that there is distance of 10 cm from the cargo, the control unit 2 records moving distances of the first movable shelf layer 4 and the second movable shelf layer 3 so as to accomplish the placement of the first cargo.

To start determining the placement area of the second cargo according to the size of the cargo, if the length or width can be placed within the range formed by the horizontal and vertical column (i.e., the allocated area) where the first cargo is located, the second cargo is placed into the range, otherwise it is placed within an undefined area (i.e., the unallocated area) on the diagonal. Similar to the first cargo, the control unit 2 controls the first movable shelf layer 4 and the second movable shelf layer 3 to start moving, and the first distance detector 8 and the second distance detector 7 of the shelf layer start to work and record a moving distance.

So far, an area to be divided and a divided area having a different size have been formed. Afterwards, each cargo will be placed based on the size. If the cargo can match a divided area (the length and width of the cargo are not 20 cm less than the divided area, so as to avoid the case that a small cargo is placed within a large frame), it is placed in the allocated area in priority. If not, it is placed in an unallocated area, and at the same time a new unallocated area is formed. When all the areas have been divided, the divided areas are sequentially filled up according to the matching degree of the cargos with the divided areas.

The present disclosure also provides an unmanned logistics system including the above-described automatically adjustable smart shelf. The unmanned logistics system can be applied to unmanned warehousing, unmanned transport vehicles, unmanned logistics transfer vehicles, unmanned distribution stations, unmanned vehicles, and drones. Since the automatically adjustable smart shelf of the present disclosure can make fully occupied use of the shelf space and improve the storage capacity of the shelf. Correspondingly, the unmanned logistics system of the present disclosure also has the above-described advantageous technical effects, which will not be described in detail here.

The above embodiments in conjunction make a detailed description of the implementations of the present disclosure, but the present disclosure is not limited to the implementations as described. For those skilled in the art, multiple changes, modifications, equivalent replacements, and variations to these embodiments without departing from the principles and essential spirit of the present disclosure still fall within the protection scope of the present disclosure.

What is claimed is:

1. An automatically adjustable smart shelf, comprising:
    a shelf outer frame;
    at least one first movable shelf layer and at least one second movable shelf layer provided on the shelf outer frame and respectively movable along a first direction and a second direction intersecting with each other;
    a control unit configured to control the at least one first movable shelf layer and the at least one second movable shelf layer to move along the first direction and the second direction respectively, so as to form various sizes of storage space for storing various cargos respectively;
    a first distance detector provided on the at least one first movable shelf layer to detect a distance between the at least one first movable shelf layer and a cargo and feed the distance back to the control unit; and
    the at least one second movable shelf layer is provided with a second distance detector configured to detect a distance between the at least one second movable shelf layer and a cargo and feed the distance back to the control unit.

2. The automatically adjustable smart shelf according to claim 1, wherein the first direction is a horizontal direction, the second direction is a vertical direction, and the at least one first movable shelf layer is arranged vertically and the at least one second movable shelf layer is arranged horizontally.

3. The automatically adjustable smart shelf according to claim 1, further comprising:
    a first movement guide rail provided on the shelf outer frame, on which the at least one first movable shelf layer is configured to move; and
    a second movement guide rail provided on the shelf outer frame, on which the at least one second movable shelf layer is configured to move.

4. The automatically adjustable smart shelf according to claim 1, wherein the at least one first movable shelf layer and the at least one second movable shelf layer are both formed of a plurality of rods.

5. The automatically adjustable smart shelf according to claim 4, further comprising a movement guide rail provided on the shelf outer frame, wherein both ends of each of the plurality of rods in the at least one first movable shelf layer are mounted on the movement guide rail, and both ends of each of the plurality of rods in the at least one second movable shelf layer are mounted on the movement guide rail.

6. The automatically adjustable smart shelf according to claim 1, further comprising:
    a second guide rail provided on the shelf outer frame and on both sides of the at least one first movable shelf layer, on which the at least one second movable shelf layer is movable; and
    a first guide rail provided on the shelf outer frame and on both sides of the at least one second movable shelf layer, on which the at least one first movable shelf layer is movable.

7. The automatically adjustable smart shelf according to claim 1, wherein the first distance detector is configured to detect a distance between the at least one first movable shelf layer and the shelf outer frame and feed the distance back to the control unit, and the second distance detector is configured to detect a distance between the at least one second movable shelf layer and the shelf outer frame and feed the distance back to the control unit.

8. An unmanned logistics system comprising:
    the automatically adjustable smart shelf according to claim 1.

* * * * *